United States Patent
Kuenzi et al.

(10) Patent No.: US 11,164,413 B2
(45) Date of Patent: Nov. 2, 2021

(54) ACCESS CONTROL SYSTEM WITH SECURE PASS-THROUGH

(71) Applicant: CARRIER CORPORATION, Jupiter, FL (US)

(72) Inventors: Adam Kuenzi, Silverton, OR (US); Bradley Armand Scoville, Farmington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/477,082

(22) PCT Filed: Jan. 19, 2018

(86) PCT No.: PCT/US2018/014434
§ 371 (c)(1),
(2) Date: Jul. 10, 2019

(87) PCT Pub. No.: WO2018/136744
PCT Pub. Date: Jul. 26, 2018

(65) Prior Publication Data
US 2019/0340852 A1     Nov. 7, 2019

Related U.S. Application Data (60) Provisional application No. 62/449,399, filed on Jan. 23, 2017.

(51) Int. Cl.
*G07C 9/23*     (2020.01)
*H04W 12/06*     (2021.01)

(52) U.S. Cl.
CPC .............. *G07C 9/23* (2020.01); *H04W 12/06* (2013.01)

(58) Field of Classification Search
CPC .................. G07C 9/00174; G07C 2009/00865
(Continued)

(56) References Cited

U.S. PATENT DOCUMENTS

| 7,315,823 B2 | 1/2008 | Broendrup |
| 7,733,213 B2 | 6/2010 | Levine |

(Continued)

FOREIGN PATENT DOCUMENTS

| WO | 2012094667 A1 | 7/2012 |
| WO | 2016087482 A1 | 6/2016 |

(Continued)

OTHER PUBLICATIONS

Anonymous, "Onity Introduces Hotel Mobile-Key Solution at HITEC 2015", 2015, Online Retrieved URL<https://en.onity.com/MediaCenter/Pages/Onity-Introduces-Hotel-Mobile-Key-Solution-at-HITEC-2015.aspx>, 2 pages.

(Continued)

*Primary Examiner* — Fabricio R Murillo Garcia
(74) *Attorney, Agent, or Firm* — Cantor Colburn LLP (57) ABSTRACT

The mobile device (12) sends credentials to the authentication module (18), which may be the credential module (36) of the first access control device (16a). If these credentials are authenticated, the first access control device (16a) allows access to its associated first secured element (17a) and puts the access control devices (16a, 16b) in the second mode, viz. the secure-pass-through-mode. Any request to access a second secured element (17b) received from the mobile device (12) in the second mode is passed on and treated as an authenticated request to a second access control device (16b). The access control devices (16a, 16b) allow access to their associated secured elements (17a, 17b) based on whether the type of access being requested is consistent with the type of credentials.

18 Claims, 6 Drawing Sheets

(58) Field of Classification Search
USPC ........................................................ 340/5.61
See application file for complete search history.

(56) References Cited

U.S. PATENT DOCUMENTS

| | | | |
|---|---|---|---|
| 8,730,004 B2 | 5/2014 | Elfstrom et al. | |
| 8,903,425 B2 | 12/2014 | Guenec et al. | |
| 9,173,101 B1 | 10/2015 | Angelov et al. | |
| 9,202,322 B2 | 12/2015 | Kappeler et al. | |
| 9,367,975 B2 | 6/2016 | Robertson et al. | |
| 2007/0176739 A1 | 8/2007 | Raheman | |
| 2010/0283579 A1* | 11/2010 | Kraus | G07C 9/00944 340/5.7 |
| 2012/0089522 A1 | 4/2012 | Gemmo | |
| 2013/0089522 A1 | 4/2013 | Zhang et al. | |
| 2013/0191884 A1 | 7/2013 | Leicher et al. | |
| 2013/0326595 A1* | 12/2013 | Myers | G07C 9/00174 726/4 |
| 2014/0002236 A1 | 1/2014 | Pineau et al. | |
| 2014/0143841 A1* | 5/2014 | Karaoguz | G06F 21/10 726/4 |
| 2014/0298398 A1 | 10/2014 | Neely | |
| 2015/0170448 A1 | 6/2015 | Robfogel et al. | |
| 2015/0018715 A1 | 7/2015 | Lagerstedt et al. | |
| 2015/0187151 A1* | 7/2015 | Lagerstedt | G07C 9/28 340/5.61 |
| 2015/0199863 A1 | 7/2015 | Scoggins et al. | |
| 2015/0235496 A1 | 8/2015 | Vecchiotti et al. | |
| 2016/0005248 A1 | 1/2016 | Aase | |
| 2016/0009525 A1 | 1/2016 | Depaola et al. | |
| 2016/0044472 A1 | 2/2016 | Person | |
| 2016/0232728 A1 | 8/2016 | Allibhoy et al. | |
| 2016/0248782 A1 | 8/2016 | Troesch | |
| 2017/0265026 A1* | 9/2017 | Ahearn | G07C 9/00174 |

FOREIGN PATENT DOCUMENTS

| | | |
|---|---|---|
| WO | 2016087483 A1 | 6/2016 |
| WO | 2016100293 A1 | 6/2016 |
| WO | 2016089832 A1 | 9/2016 |
| WO | 2016166362 A1 | 10/2016 |

OTHER PUBLICATIONS

Robarts, "myPort app unlocks doors and calls elevators for you", 2014, Online retrieved URL:<https://newatlas.com/myport-building-access-app/35084/>, 3 pages.
PCT ISR/WO, dated Jun. 25, 2018, Application No. PCT/US2018/014434, 15 pages.

\* cited by examiner

ACCESS CONTROL SYSTEM WITH SECURE PASS-THROUGH

BACKGROUND

The following description relates to access control systems and, more particularly, to an access control system with a secure pass-through.

An access control system operates by encoding data on a physical key card that indicates access rights. Some access control systems are generally operated in an online mode where readers communicate with a centralized server of the access control system via a network to determine whether or not to grant access. In such online systems, the access rights are often a reference identifier or some other similar element. Other access control systems are offline with access rights encoded as data that can be decoded and interpreted by offline locks to retrieve access rights. An example is a hotel locking system in which a front desk worker encodes a guest card and an offline, battery powered lock on a guest room door decodes the key card and thus permits or denies access based on the encoded access rights. Some methods of encoding access rights include sequencing where subsequent access rights have a sequence number that is greater than the prior access rights. Some methods of encoding access rights also include utilizing a mobile device to deliver the access credential.

In addition to access rights for opening doors, guests or visitors that arrive at hotels or office buildings often need Wi-Fi credentials to securely access networks in their rooms or office buildings. Currently, hotels distribute such credentials using no security at all, using semi-secure access codes or by way of special systems that require web servers, firewalls and complicated software.

BRIEF DESCRIPTION

According to one aspect of the disclosure, an access control system is provided and includes a credential authenticator and first and second devices. The first and second devices are disposed for first and second access restrictions and are operable in respective first and second modes. The first device is responsive to a request for first access delivered thereto by a mobile device and the second device is responsive to a request for second access delivered thereto via the first device by the mobile device. In the respective first modes, the first and second devices maintain the first and second access restrictions, respectively. In the respective second modes, the first and second devices permit the first and second access, respectively. The respective second modes are effectuated based on credentials being transmitted from the mobile device to and authenticated by the credential authenticator.

In accordance with additional or alternative embodiments, the credential authenticator is provided within a Bluetooth™ module.

In accordance with additional or alternative embodiments, the credential authenticator is remote from the first and second devices.

In accordance with additional or alternative embodiments, the credential authenticator is a component of one of the first and second devices.

In accordance with additional or alternative embodiments, the mobile device includes one or more of a portable computing device, a smartphone and a tablet.

In accordance with additional or alternative embodiments, the first device includes a door lock.

In accordance with additional or alternative embodiments, the first device includes a door lock and the second device includes a Wi-Fi credential database.

In accordance with additional or alternative embodiments, the first device includes a set top box and the second device includes an environmental controller.

In accordance with additional or alternative embodiments, the first device includes an elevator kiosk and the second device includes an elevator dispatch system.

In accordance with additional or alternative embodiments, the first device comprises a refrigeration unit.

In accordance with another aspect of the disclosure, an access control system is provided. The access control system includes a module having a credential authenticator whereby an application with credentials stored thereon is executable to establish a connection between a mobile device and the module such that the credentials are transmittable thereto for authentication by the credential authenticator and first and second devices respectively disposed to restrict access to first and second secured elements. The first device being operable responsive to a request for access to the first secured element, which is issued by the mobile device, in first and second modes. The second device being operable responsive to a request for access to the second secured element, which is issued by the mobile device via the first device operating in the second mode, in first and second modes. In the respective first modes, the first and second devices restrict the access to the first and second secured elements. In the respective second modes, the first and second devices permit the access to the first and second secured elements based on the credentials being authenticated by the credential authenticator and a type of the credentials.

In accordance with additional or alternative embodiments, the module includes a Bluetooth™ module.

In accordance with additional or alternative embodiments, the mobile device includes one or more of a portable computing device, a smartphone and a tablet.

In accordance with additional or alternative embodiments, the first device includes a door lock.

T In accordance with additional or alternative embodiments, the first device includes a door lock and the second device includes a Wi-Fi credential database.

In accordance with additional or alternative embodiments, the first device includes a set top box and the second device includes an environmental controller.

In accordance with additional or alternative embodiments, the first device includes an elevator kiosk and the second device includes an elevator dispatch system.

In accordance with additional or alternative embodiments, the first device includes a refrigeration unit.

According to yet another aspect of the disclosure, an access control method is provided. The access control method includes storing mobile credentials in an application of a mobile device, identifying that the mobile device is within range of a module having a credential authenticator, executing the application to establish a connection with the module whereby the mobile credentials are transmittable to the module for authentication by the credential authenticator and operating first and second devices in respective secure-pass-through modes such that the first and second devices permit access to first and second secured elements, respectively, based on the credentials being authenticated by the credential authenticator and a type of the credentials in respective response to first and second requests. The first request is for first secured element access issued by the mobile device to the first device and the second request is for second secured element access issued by the mobile device to the second device via the first device operating in the secure-pass-through mode.

In accordance with additional or alternative embodiments, mobile credential transmission for authentication includes sending the mobile credentials from the mobile device to the module, validating the credentials at the module and establishing the secure-pass-through mode.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

As will be described below, an access control system is provided in which a person with a mobile device, also called a mobile unit, can obtain access to a secure element through an access control device by a secure "pass-through" mode of communication between the mobile device and the access control device which is allowed after authentication of access rights with mobile credentials. The secure "pass-through" mode of communication allows the mobile device to communicate with or exchange additional data with the secure element in addition to accessing the secured element by way of the access control device.

In an operation of the access control system, an access control device is typically communicated with or accessed, for example, to open a lock and enter a secure room or space, to open a cabinet, to enable use of equipment or, more generally, to access a secured element. Additional data for the secure element may be used in various ways including reading the data, writing the data or a combination thereof. The system can be deployed in use cases such as where a phone authenticates to a guest room door and requests/receives Wi-Fi credentials for the guest Wi-Fi network, where a phone authenticates to a reader by an entrance door and requests/receives Wi-Fi credentials for the building Wi-Fi network, where a phone authenticates to a set-top or media box in a guest room utilizing a mobile credential and requests/receives a netflix id/password that is linked to their stay and can immediately permit them to view content on their mobile device, where a phone authenticates to an elevator control kiosk using a mobile credential and requests/receives an elevator assignment for a requested destination floor that is displayed on the mobile device, where a phone authenticates to a vehicle to open a door or start the vehicle and requests/receives telematics data (such as fuel level, odometer setting, etc.) or where a phone authenticates to a device and reads/writes configuration data (such as operation time, temperature level, or any configurable parameter in the device). In effect, the access control system provides for authentication and validation of a user with a mobile device to access a secured element and, in addition, provides for additional access to a secured element that otherwise would have required a completely separate authentication and validation to access.

Figure 1:
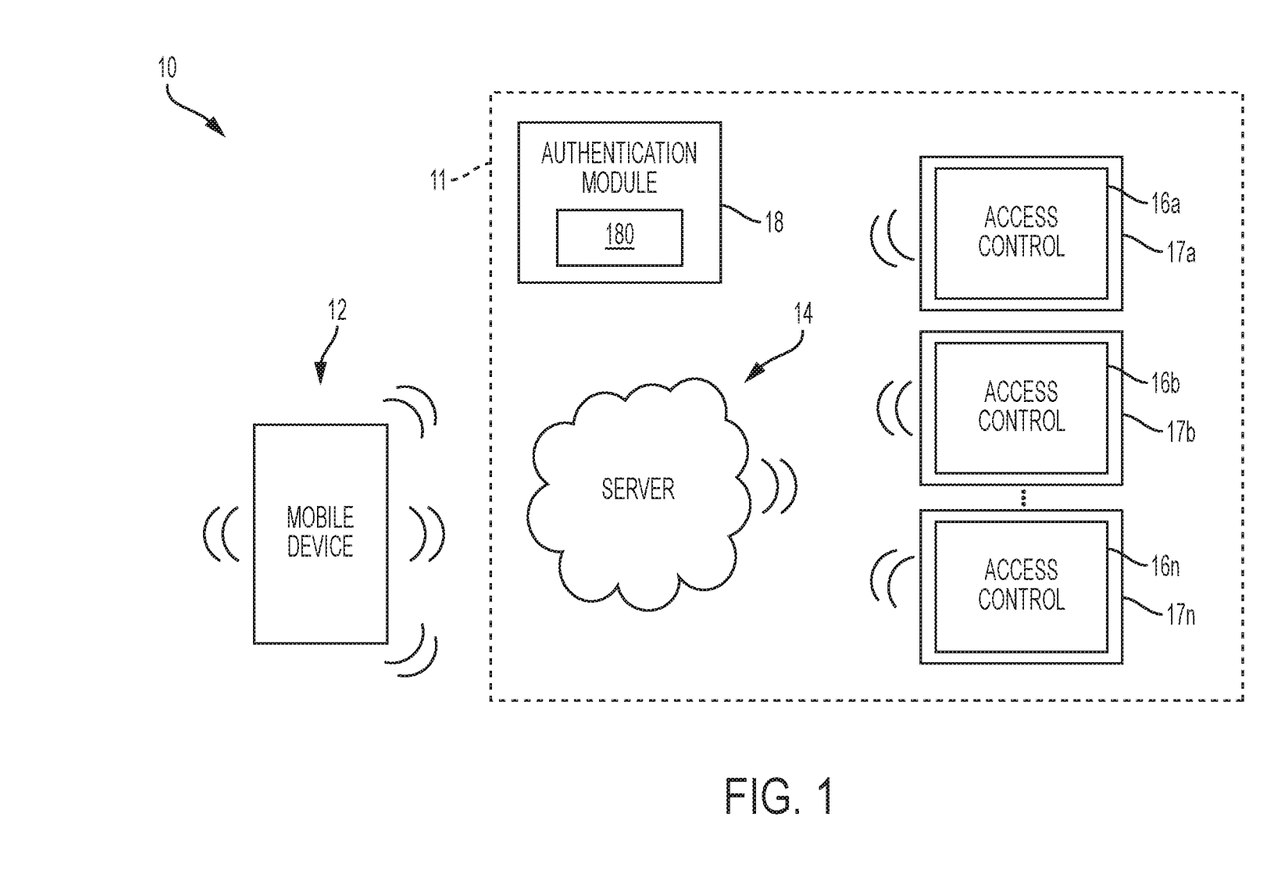
FIG. 1 is a general schematic system diagram of a user authentication system.

With reference to FIG. 1, an access control system 10 is provided and may be deployed in a building 11, such as a hotel or an office building. The access control system 10 includes a mobile device 12, a server 14, a plurality of access controls 16a, 16b, . . . , 16n and an authentication module 18 which may be provided as a Bluetooth™ module 180. The mobile device 12 may be a wireless capable handheld device, such as a smartphone or tablet, which is operable to communicate with the server 14, the access controls 16a, 16b, . . . , 16n and the authentication module 18. The server 14 may provide mobile credentials and other data to the mobile device 12, such as firmware or software updates to be communicated to one or more of the access controls 16a, 16b, . . . , 16n. Although the server 14 is depicted herein as a single device, it should be appreciated that the server 14 may alternatively be embodied as a multiplicity of systems from which the mobile device 12 receives mobile credentials and other data. Each of the access controls 16a, 16b, . . . , 16n is a wireless-capable, restricted-access or restricted-use device such as wireless locks, access control readers for building entry, electronic banking controls, data transfer devices, key dispenser devices, tool dispensing devices, elevator kiosks, vehicle control systems and other restricted-use machines. As such, each of the access controls 16a, 16b, . . . , 16n is disposed to restrict access to a corresponding secured element 17a, 17b, . . . , 17n.

That is, access control 16a may be provided as a first device, such as a door lock, with the secured element 17a thus being provided as a guest room and access control 16b may be provided as a second device, such as a database including Wi-Fi passwords for Wi-Fi access in the secured element 17a, with the secured element 17b being provided as the password for the guest room.

In typical access control systems, the mobile device 12 may be configured to submit credentials to the access controls 16a, 16b, . . . , 16n to thereby gain access for the user. For example, a user may use the mobile device 12 to submit a credential to an electromechanical lock to unlock it to thus gain access to his guest room. The mobile device 12 may store multiple types of credentials and some credentials may be used for multiple access controls 16a, 16b, . . . , 16n.

Figure 2:
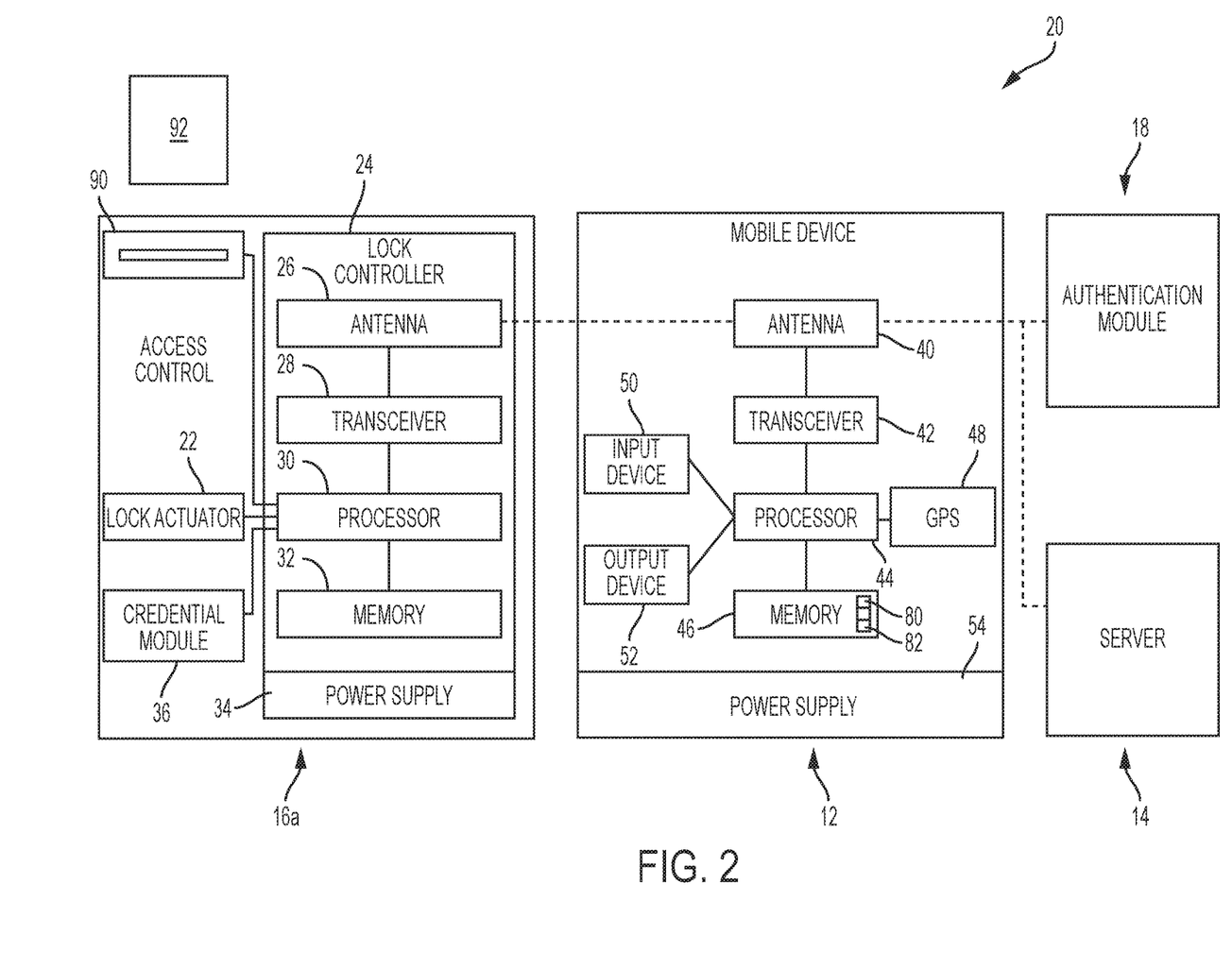
FIG. 2 is a block diagram of the user authentication system.

With reference to FIG. 2, a block diagram of an example electronic lock system 20 includes the access control 16a, the mobile device 12, the server 14 and the authentication module 18. The access control 16a generally includes a lock actuator 22, a lock controller 24, a lock antenna 26, a lock transceiver 28, a lock processor 30, a lock memory 32, a lock power supply 34 and a lock card reader 90 and a credential module 36. The access control 16a is responsive to credentials from the mobile device 12, and may, for example, be the lock of a lockbox, a door lock or a lock core. Although the present disclosure focuses primarily on credentials for access control, it should be appreciated that other systems wherein credentials are transmitted from a mobile device to an access control so as to identify the user to an online system or validate user access rights or permissions in an offline system will benefit herefrom. Such systems include virtual or electronic banking systems, machine operation systems, dispensing systems, human conveyance systems (e.g. elevators, turnstiles, subways, trains and the like) and data access system.

Upon receiving and authenticating an appropriate credential from the mobile device 12 using the credential module 36 or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, or Wi-Fi transceiver, or another appropriate wireless transceiver. The lock antenna 26 is any antenna appropriate to the lock transceiver 28. The lock processor 30 and lock memory 32 are, respectively, data processing and storage devices. The lock processor 30 may, for instance, be a microprocessor that can process instructions to validate card data and determine the access rights contained in the card data or to pass messages from a transceiver to a credential module 36 and to receive a response indication back from the credential module 36 with card data. The lock memory 32 may be RAM, EEPROM or other storage medium where the lock processor 30 can read and write data including but not limited to lock configuration options and the lock audit trail. The lock audit trail may be a unified audit trail that includes events initiated by accessing the lock via the lock card reader 90 or the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

The credential module 36 is in communication with the lock processor 30 and is operable to decrypt and validate a credential to extract virtual card data communicated into the lock controller 24 as a "virtual card read." That is, the access control 16a has essentially two readers, one reader 90 to read a physical key card 92 and the credential module 36 to communicate with the mobile device 12 via the lock processor 30 and the transceiver 28 and antenna 26.

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module 36 or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module 36 may communicate directly to the mobile device 12 through the transceiver 28. In other embodiments the credential module may be a software module whole executed within the processor 30.

The mobile device 12 generally includes a key antenna 40, a key transceiver 42, a key processor 44, a key memory 46, a GPS receiver 48, an input device 50, an output device 52 and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14, the access controls 16a, 16b, . . . , 16n and the authentication module 18. In other embodiments, one or more separate transceivers and antennas may be included to communicate with the server 14, the access controls 16a, 16b, . . . , 16n and the authentication module 18. The key memory 46 is of a type to store a plurality of credentials locally on the mobile device 12. In other embodiments, the mobile device 12 communicates with the server 14 at the same time as it communicates to the access control 16a. This is the online configuration and in this embodiment a mobile credential is retrieved in real time and is passed to the credential module 36 without storing first in the key memory 46 on the mobile device 12.

In some embodiments, the authentication module 18 is used in one or more of the access controls 16a, 16b, . . . , 16n as the credential module 36. In other embodiments, the authentication module 18 is used to connect to other equipment (not shown), such as a secure element which is protected by the authentication module 18.

Figure 3:
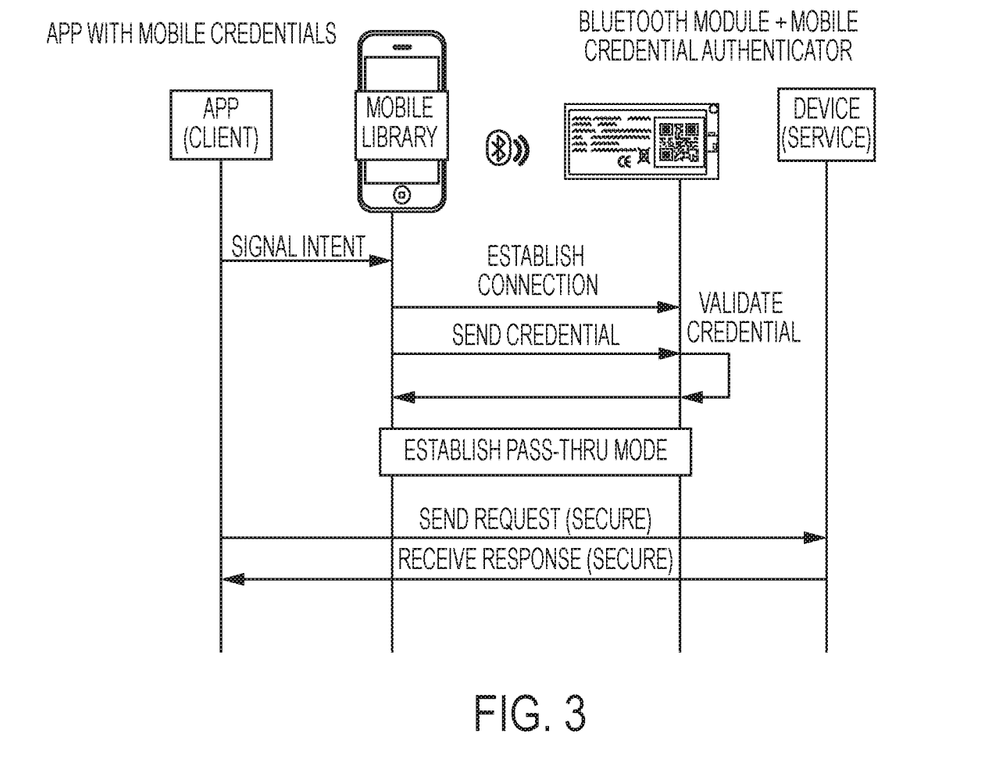
FIG. 3 is a diagram illustrating an operation of a user authentication system.

With reference to FIG. 3, during an operation of the electronic lock system 20, a user of the mobile device 12 stores an application in the key memory 46 and registers to stay in a hotel in which the electronic lock system 20 is deployed. Upon such registration, which may be completed by way of the application, or at another point, a set of mobile credentials for the user are generated which grant the user access rights to certain secured elements (e.g., the user's room, the weight room and spa, Wi-Fi access in the user's room, etc.) of the hotel during the days of his stay. These mobile credentials are forwarded to the mobile device 12 and stored in the key memory 46. As shown in FIG. 3, at the time of his reservation and once the user approaches the proximity of the hotel property and thus comes in range of the authentication module 18, which again may be provided as a Bluetooth™ module 180 or as the credential module 36 with an integrated transceiver 28 and antenna 26, the application signals an intent to the key memory 46 and thereby causes the mobile device 12 to establish a connection with the authentication module 18. With this connection established, the mobile credentials are transmitted from the key memory 46 to the authentication module 18 whereupon they are either validated or invalidated. If the mobile credentials are invalidated, the user is not and cannot be granted access to secured elements. On the other hand, if the mobile credentials are validated, the authentication module 18 and the electronic lock system 20 effectively generate a secure pass-through state for the mobile device 12 and the user.

The authentication module 18 will receive the encrypted mobile credential and then validate and decrypt the mobile credentials to retrieve virtual card data. The decryption and validation may include, but is not limited to, validating a digital signature, validating the type of the mobile credential, validating that the mobile credential identifier matches an identifier in the lock memory 32, validating a starting date and an expiring date of the mobile credential, validating the source of the mobile credential, etc. Once the mobile credential is validated and decrypted, the virtual card data is extracted.

Additionally, for an authentication module 18 in the form of a credential module 36 in access control 16a, once the mobile credential is validated and decrypted, virtual card data can be extracted and sent to the lock processor 30 for additional validation. Once the application on the mobile device 12 has successfully traversed the authentication to an authentication module 18 with the mobile credential as described above, the authentication module 18 will allow additional messages to be sent over the connection.

With the secure pass-through state generated, the application can be further executed to cause the mobile device 12 to issue a first request to a first one of the access controls 16a, 16b, . . . , 16n (access control 16a, for example) for access to the secured element 17a and to issue a second secure request to a second one of the access controls 16b, . . . , 16n (access control 16b, for example) via the first access control 16a for access to the second secured element 17b. In such a case, if the access control 16a is the user's guest room door and the user's mobile credentials have already been validated by the authentication module 18, the authentication module 18 will communicate with the access control 16a to instruct the access control 16a that the user's mobile credentials have been validated so that the access control 16a permits the user to access the guest room in response to the first request and so that the access control 16b can respond to the second secure request with a secure response visa the access control 16a.

In accordance with embodiments, the access control 16a for example may be provided as a first device serving as a door lock for a guest room in a hotel and the first secured element 17a may be provided as the guest room or as a refrigeration unit in a vehicle and the first secured element 17a may be provided as the environmental control system of that vehicle. In accordance with further embodiments, the access control 16a may be provided as a first device serving as a door lock, the first secured element 17a may be provided as the guest room, the access control 16b may be provided as a second device serving as a Wi-Fi credential database and the second secured element 17b may be provided as the set of Wi-Fi login and password combinations for each guest room in a hotel. In accordance with alternative and further embodiments, the access control 16a may be provided as a first device serving as a set top box, the first secured element 17a may be provided as the television in a guest room, the access control 16b may be provided as a second device serving as an environmental controller and the second secured element 17b may be provided as the environmental controls for each guest room in a hotel. In accordance with other alternative and further embodiments, the access control 16a may be provided as a first device serving as an elevator kiosk, the first secured element 17a may be provided as elevator controls, the access control 16b may be provided as a second device serving as an elevator dispatch system and the second secured element 17b may be provided as the elevator cars in a hotel.

Figure 4:
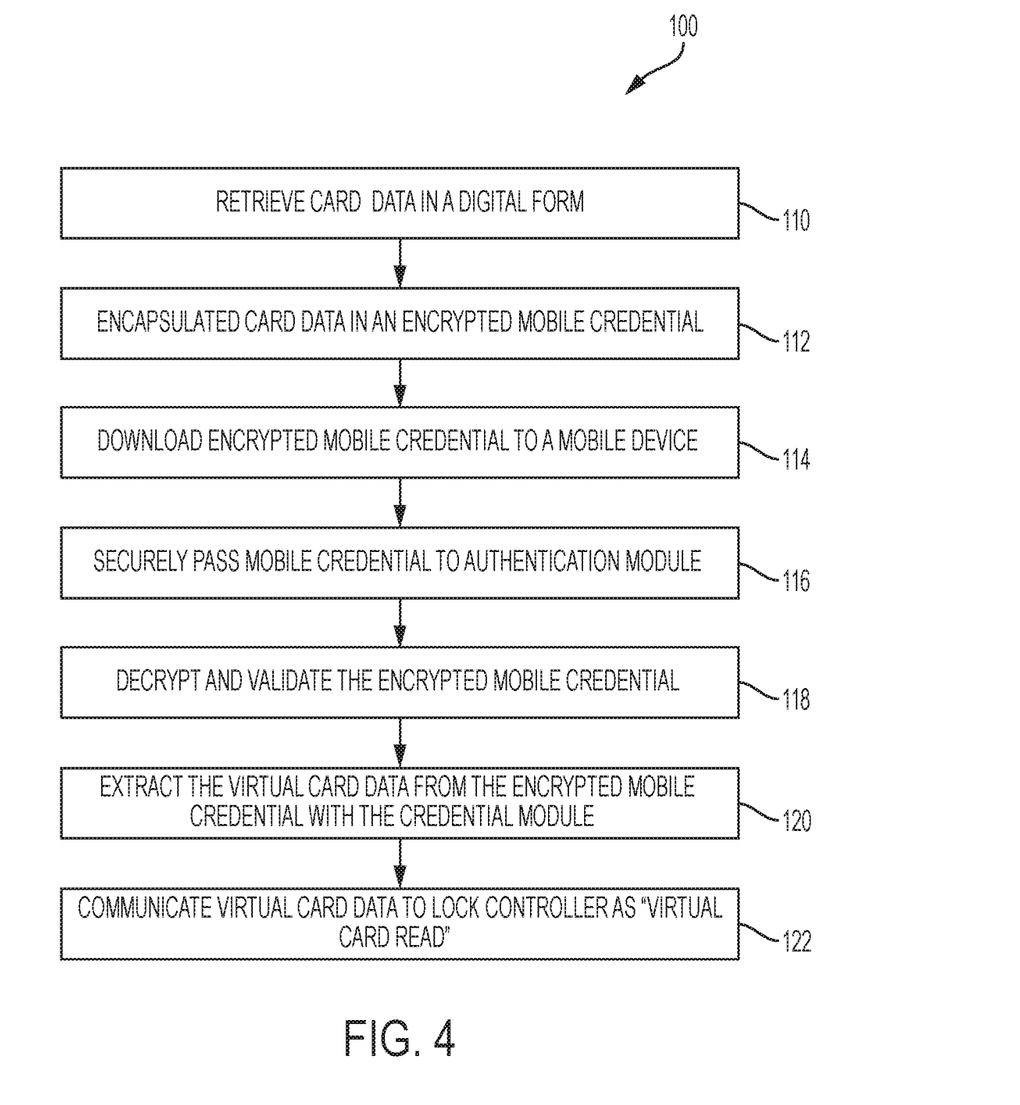
FIG. 4 is a flowchart of a credential management method performed by the user authentication system.

With reference to FIG. 4, a method 100 to facilitate communication of a credential representative of data that would normally be physically encoded on a key card 92 (see FIG. 5) is provided. The method includes retrieving card data in digital form (block 110), encapsulating the card data in an encrypted mobile credential (block 112) and downloading the mobile credential to the mobile device 12 (block 114). The method further includes securely passing to the authentication module 18 (block 116) when the user and the mobile device 12 are within the range of the authentication module 18 (i.e., on the property of a hotel). The authentication module 18 then decrypts and validates the mobile credential (block 118), extracts the card data (block 120) and passes the card data into the lock controller 24 as a "virtual card read" (block 122).

This, for example, permits a user to bypass a front desk of a hotel and go directly to their room. The encrypted mobile credential may be generated by the server 14 using well known techniques for digital certificate creation and encryption using cryptographic algorithms such as AES, ECC, RSA, and the like. For example, the mobile credential may contain but is not limited to including a mobile credential identifier, unique access control identifier, unique credential module identifier, an identifier shared with multiple access controls, a parameter indicating the type or format of the credential, it may contain encrypted data such as the virtual card data, and it may contain a digital signature. The encrypted data may be encrypted with an AES-128 encryption key that can be known to the authentication module 18 or it may be encrypted with a derived encryption key that can be determined from information contained in the mobile credential. Further, the digital signature may be a CBC-MAC type signature based on an AES-128 encryption key, for example, that can be known by the authentication module 18 or it could be a digital signature based on a private key known to the server 14 and can be validated by a public key known to the authentication module 18.

Figure 5:
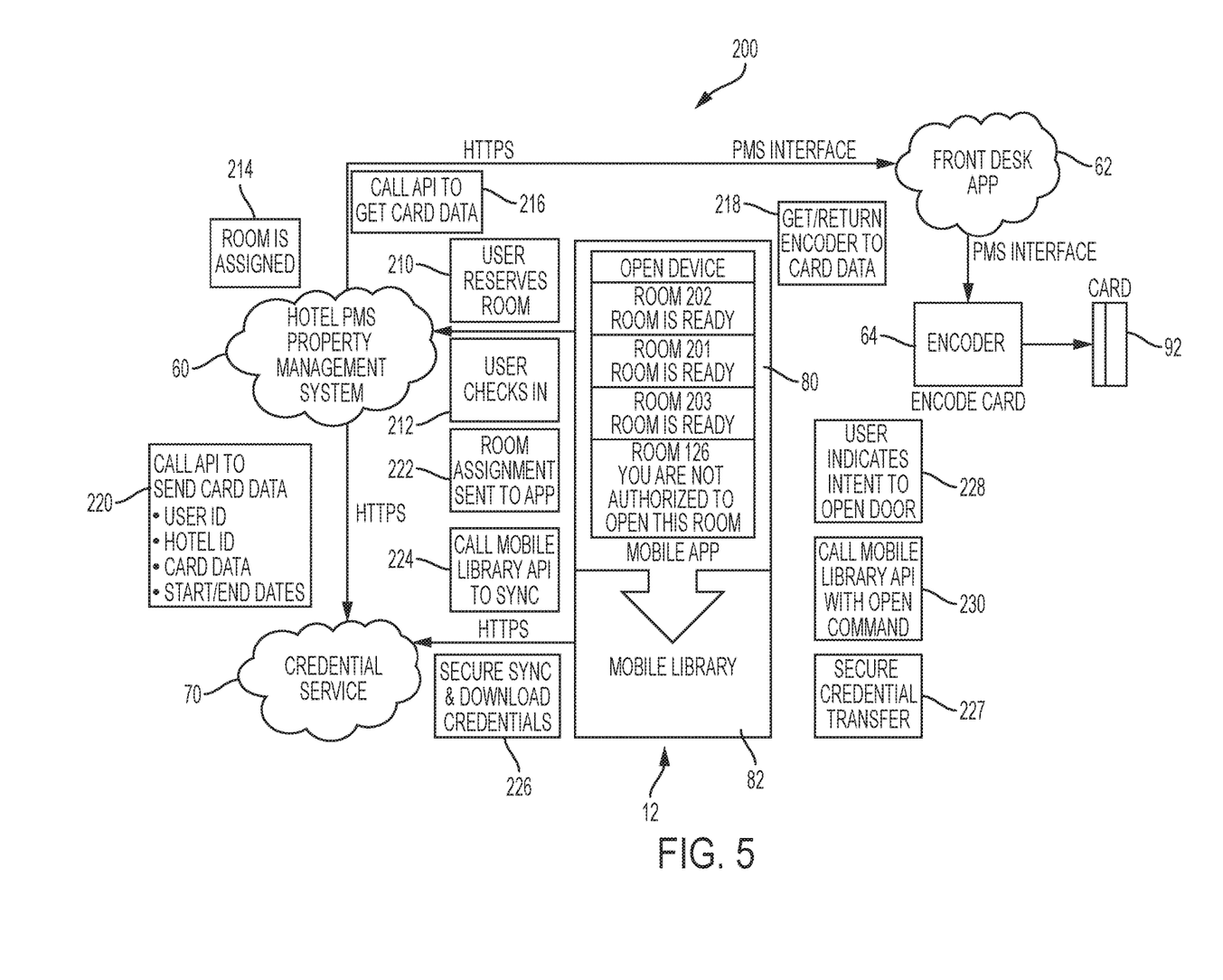
FIG. 5 is a flowchart of a credential management method performed by the user authentication system according to one disclosed non-limiting embodiment.

With reference to FIG. 5, in an exemplary case, a user first reserves a hotel room (block 210) through any process supported by a hotel, such as mobile reservations, web sites, travel agents, etc., and then completes a check-in procedure to confirm their stay (block 212). A room is then assigned in a hotel property management system 60 based on the guest preferences and the room availability on check-in (block 214). The hotel property management system 60 may use a software-to-software application programming interface (API) provided by a front desk application 62 to request card data in a digital form (block 216). The front desk application 62 may range from a stand-alone encoder 64 to a complete software package running in a cloud that is operable to encode a virtual card for the room that was selected and return the virtual card data back to the hotel system (block 218). Next, the hotel property management system 60 will make another software-to-software API call to a credential service 70 after the hotel system has allocated a room (block 220). The pertinent information is communicated to the credential service 70 with an indication to include, for example, what hotel property, what room, what guest (e.g. User ID), what dates and also the virtual card data for the stay. The hotel property management service 60 may also communicate an indication to the user (again, through any conventional method) that the check-in is confirmed and the room is assigned (block 222).

A mobile device 12 based hotel loyalty mobile application 80 will utilize a software-to-software API in a mobile library 82 (block 224) to download mobile credentials from the credential service 70 (block 226). The mobile library 82 will securely authenticate to the credential service 70 with a prior established shared secret that may change on every successful connection.

Once authenticated, the credential service 70 generates at the time of the communication from the mobile library 82 the mobile credentials for the user and encrypts into the mobile credentials the virtual card data received in block 220 for the guest associated with this instance of the mobile library 82. One credential may be generated for each access control 16a, 16b, . . . , 16n and the virtual card data will be the same in each of these separate mobile credentials but may be encrypted with unique keys for each. The method of encryption may be AES, 3DES or other such encryption method. The method and type of credential used may be a compressed digital certificate or a standard based certificate like X.509 or certificate format known to the art. That is, for example, the virtual card data is encrypted into the mobile credential with a unique key known by the authentication module 18 and know or determinable by the credential service 70. The mobile library 82 will download and store the list of mobile credentials on the mobile device 12 using native OS protections and additional encryption of data with device specific information, e.g., UDID, IMEI, IMSI, MAC addresses, etc.

Once the mobile credentials are validated by the authentication module 18 (block 227), the user will be able to operate the access controls 16a, 16b, . . . , 16n that he is authorized to operate in an offline mode at any later time without the mobile device 12 being required to be connected to the credential service 70. Thus, when the user wishes to access his room (block 228), the user may indicate such intent through a gesture, a click of a button, a tap on the screen, a finger print read, password, proximity to the lock, touching the lock, etc. In response to this intent, the hotel loyalty mobile application 80 again calls the software-to-software API in the mobile library 82 to initiate the secure mobile device/unit request to the corresponding access control 16a (block 230).

Figure 6:
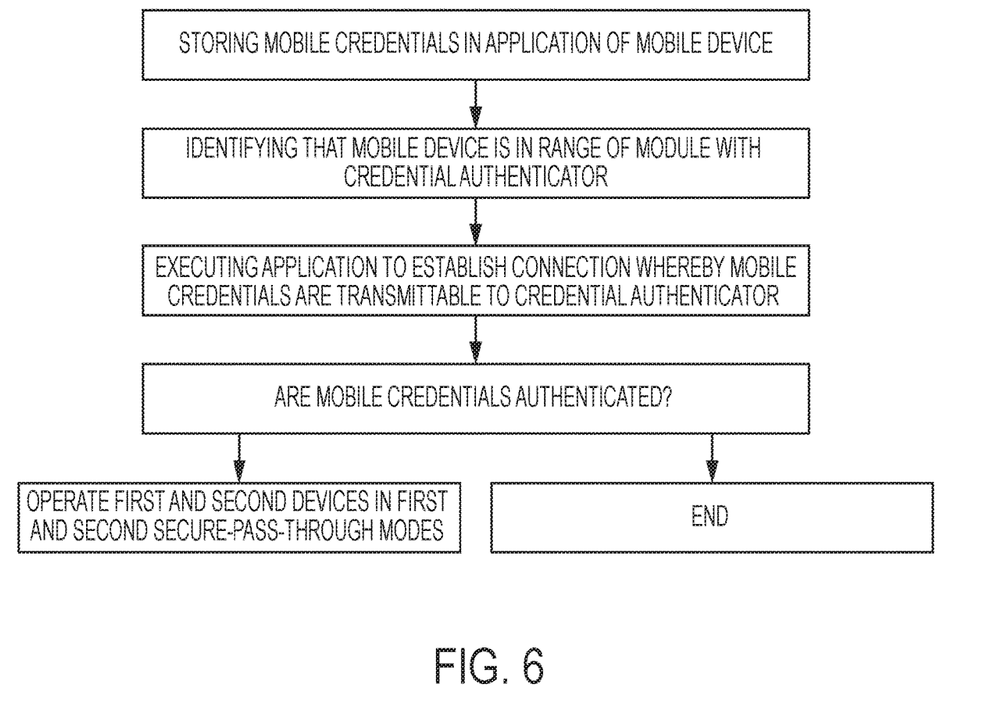
FIG. 6 is a flowchart illustrating an access control method according to embodiments.

More particularly, with reference to FIG. 6, an access control method is provided. As shown in FIG. 6, the access control method includes storing mobile credentials in an application of a mobile device (block 601) and identifying that the mobile device is within range of a module having a credential authenticator (block 602). At this point, if the mobile device is within the range of the module, the access control method further includes executing the application to establish a connection between the mobile device and the module whereby the mobile credentials stored in the application are transmittable from the mobile device and to the module for authentication by the credential authenticator (block 603).

Subsequently, it is determined whether the mobile credentials are authenticated (block 604). In an event the mobile credentials are not authenticated, the access control method ends and no access will be permitted to be granted in response to any request (block 605). On the other hand, in an event the mobile credentials are authenticated, the access control method includes operating first and second devices in respective secure-pass-through modes (block 606). As such, the first device will permit access to a first secured element based on the credentials being authenticated by the credential authenticator and a type of the credentials being determined to be consistent with a type of the access being requested in response to a first request for first secured element access which is issued by the mobile device to the first device. Meanwhile, the second device will permit access to a second secured element based on the credentials being authenticated by the credential authenticator and a type of the credentials being determined to be consistent with a type of the access being requested in response to a second request for second secured element access which is issued by the mobile device to the second device via the first device while the first device is operating in the secure-pass-through mode.

That is, in the case where the access control 16a is the first device and is serving as a door lock and the access control 16b is the Wi-Fi credential database, a guest whose smartphone has already had its mobile credentials authenticated may request access to his assigned guest room by causing his smartphone to issue a first request to the door lock. At this point, the door lock will permit the user to enter the guest room. In addition, if the user were to request the Wi-Fi login and password combination for his guest room from the Wi-Fi credential database, such request could be issued by the mobile device to the door lock as a second secure request which is responded to by the Wi-Fi credential database via the door lock.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An access control system, comprising:
a credential authenticator; and
an access controller disposed for restricting access to a restricted area and operable in first and second modes;
a second device disposed for restricting access to a second secured element and operable in first and second modes,
the access controller being responsive to a first request for first access to the restricted area being delivered to the access controller by a mobile device within a communication range of the credential authenticator,
the second device being responsive to a second request, which is distinct from the first request, for second access to the second secured element being delivered to the second device, via the access controller, by the mobile device,
wherein:
in the respective first modes, the access controller and the second device maintain the restricting of the access to the restricted area and the restricting of the access to the second secured element, respectively,
in the respective second modes, the access controller and the second device permit the first and second access, respectively, and
the respective second modes are effectuated based on credentials being transmitted from the mobile device to and authenticated by the credential authenticator.

2. The access control system according to claim 1, wherein the credential authenticator is provided within a Bluetooth module.

3. The access control system according to claim 1, wherein the credential authenticator is remote from the access controller and from the second device.

4. The access control system according to claim 1, wherein the credential authenticator is a component of one of the access controller and the second device.

5. The access control system according to claim 1, wherein the mobile device comprises one or more of a portable computing device, a smartphone and a tablet.

6. The access control system according to claim 1, wherein the second device comprises a Wi-Fi credential database.

7. The access control system according to claim 1, wherein the access controller comprises a set top box and the second device comprises an environmental controller.

8. The access control system according to claim 1, wherein the access controller comprises an elevator kiosk and the second device comprises an elevator dispatch system.

9. The access control system according to claim 1, wherein the access controller comprises a refrigeration unit.

10. An access control system, comprising:
a module having a credential authenticator whereby an application with credentials stored on the module is executable to establish a connection between a mobile device and the module such that the credentials are transmittable to the module for authentication by the credential authenticator; and
an access controller disposed to restrict access to a restricted area;
a second device disposed to restrict access to a second secured element,
the access controller being operable responsive to a first request for access to the restricted area, which is issued by the mobile device, in first and second modes, within a communication range of the credential authenticator, and
the second device being operable responsive to a second request, which is distinct from the first request, for access to the second secured element, which is issued by the mobile device via the access controller operating in the second mode, in first and second modes,
wherein:
in the respective first modes, the within a communication range of the credential authenticator, and the second device restrict the access to the restricted area and the second secured element, and
in the respective second modes, the within a communication range of the credential authenticator, and the second device permit the access to the restricted area and the second secured element based on the credentials being authenticated by the credential authenticator and a type of the credentials.

11. The access control system according to claim 10, wherein the module comprises a Bluetooth module.

12. The access control system according to claim 10, wherein the mobile device comprises one or more of a portable computing device, a smartphone and a tablet.

13. The access control system according to claim 10, wherein the second device comprises a Wi-Fi credential database.

14. The access control system according to claim 10, wherein the access controller comprises a set top box and the second device comprises an environmental controller.

15. The access control system according to claim 10, wherein the access controller comprises an elevator kiosk and the second device comprises an elevator dispatch system.

16. The access control system according to claim 10, wherein the access controller comprises a refrigeration unit.

17. An access control method, comprising:
storing mobile credentials in an application of a mobile device;
identifying that the mobile device is within range of a module having a credential authenticator;
executing the application to establish a connection with the module whereby the mobile credentials are transmittable to the module for authentication by the credential authenticator; and
operating an access controller and a second device in respective secure-pass-through modes such that the access controller and the second device permit access to a restricted area and a second secured element, respectively, based on the credentials being authenticated by the credential authenticator and a type of the credentials in respective response to:
a first request for restricted area access issued by the mobile device to the access controller, within a communication range of the credential authenticator, and
a second request, which is distinct from the first request, for second secured element access issued by the mobile device to the second device via the access controller operating in the secure-pass-through mode.

18. The access control method according to claim 17, wherein mobile credential transmission for authentication comprises:
sending the mobile credentials from the mobile device to the module;
validating the credentials at the module; and
establishing the respective secure-pass-through modes.

* * * * *